(No Model.) 6 Sheets—Sheet 1.

M. V. B. ETHRIDGE.
STAMP CANCELING AND POSTMARKING MACHINE.

No. 521,605. Patented June 19, 1894.

Witnesses
Chas Hall Adams
G. H. Trowbridge

Inventor
Martin V. B. Ethridge (No Model.) 6 Sheets—Sheet 2.

M. V. B. ETHRIDGE.
STAMP CANCELING AND POSTMARKING MACHINE.

No. 521,605. Patented June 19, 1894.

Witnesses:
Inventor:
Martin V. B. Ethridge (No Model.) 6 Sheets—Sheet 3.

M. V. B. ETHRIDGE.
STAMP CANCELING AND POSTMARKING MACHINE.

No. 521,605. Patented June 19, 1894.

Witnesses
Chas Hall Adams
G. W. Trowbridge

Inventor
Martin V. B. Ethridge (No Model.) 6 Sheets—Sheet 5.
M. V. B. ETHRIDGE.
STAMP CANCELING AND POSTMARKING MACHINE.

No. 521,605. Patented June 19, 1894.

Witnesses
Chas Hall Adams
G. H. Trowbridge

Inventor
Martin V B Ethridge (No Model.) 6 Sheets—Sheet 6.
M. V. B. ETHRIDGE.
STAMP CANCELING AND POSTMARKING MACHINE.
No. 521,605. Patented June 19, 1894.
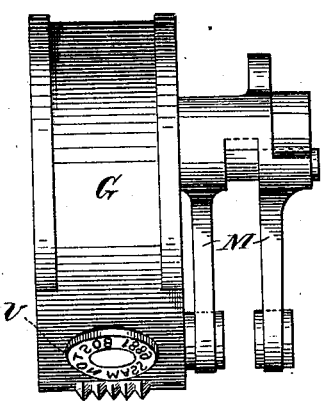
Fig. 6.
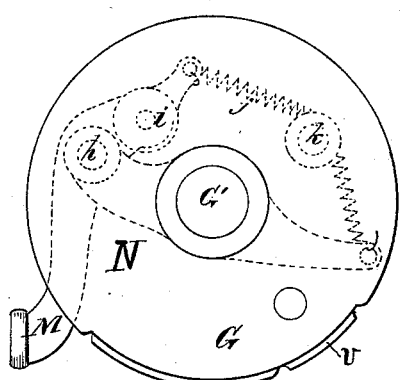
Fig. 7.
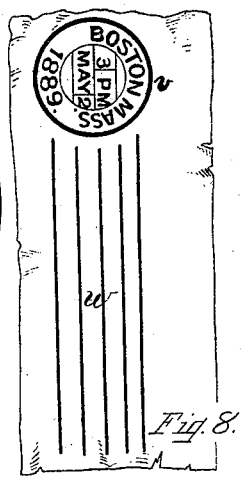
Fig. 8.
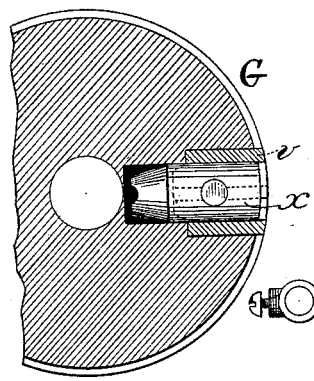
Fig. 9.
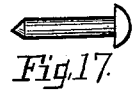
Fig. 17.
Fig. 16.
Fig. 10.
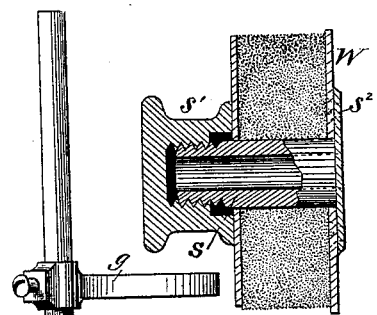
Fig. 11.   Fig. 12.
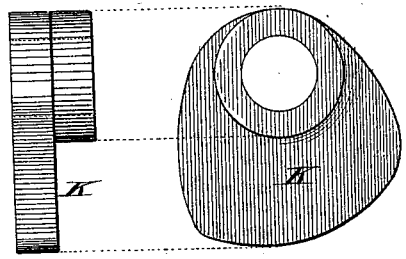
Fig. 13.   Fig. 14.   Fig. 15.
Witnesses.
Chas Hall Adams
G. W. Trowbridge.
Inventor.
Martin V B Ethridge

UNITED STATES PATENT OFFICE.

MARTIN V. B. ETHRIDGE, OF BOSTON, MASSACHUSETTS, ASSIGNOR TO THE AMERICAN POSTAL MACHINES COMPANY, OF PORTLAND, MAINE.

STAMP-CANCELING AND POSTMARKING MACHINE.

SPECIFICATION forming part of Letters Patent No. 521,605, dated June 19, 1894.

Application filed November 23, 1889. Serial No. 331,356. (No model.)

*To all whom it may concern:*

Be it known that I, MARTIN V. B. ETHRIDGE, a citizen of the United States, residing at Boston, in the county of Suffolk and State of Massachusetts, have invented certain new and useful Improvements in Stamp-Canceling and Postmarking Machines; and I do hereby declare the following to be a full, clear, and exact description of the invention, such as will enable others skilled in the art to which it appertains to make and use the same.

This invention relates to machines for stamp-canceling and postmarking letters, cards, and other mail matter, and delivering the same for sorting and distribution to the mails by one continuous series of appropriate mechanical operations, the object of the invention being to reduce the time, labor and expense of preparing mail matter for distribution and mailing, to render the operation of stamping more rapid and unfailing, and to provide a reliable machine adapted to operate automatically upon all classes and kinds of mail matter, which may be presented thereto, without regard to the great inequalities usual in the size and thickness of letters and their envelopes, and the invention consists in the construction, arrangement and combination of parts substantially as will be hereinafter fully described and claimed.

Figure 1:
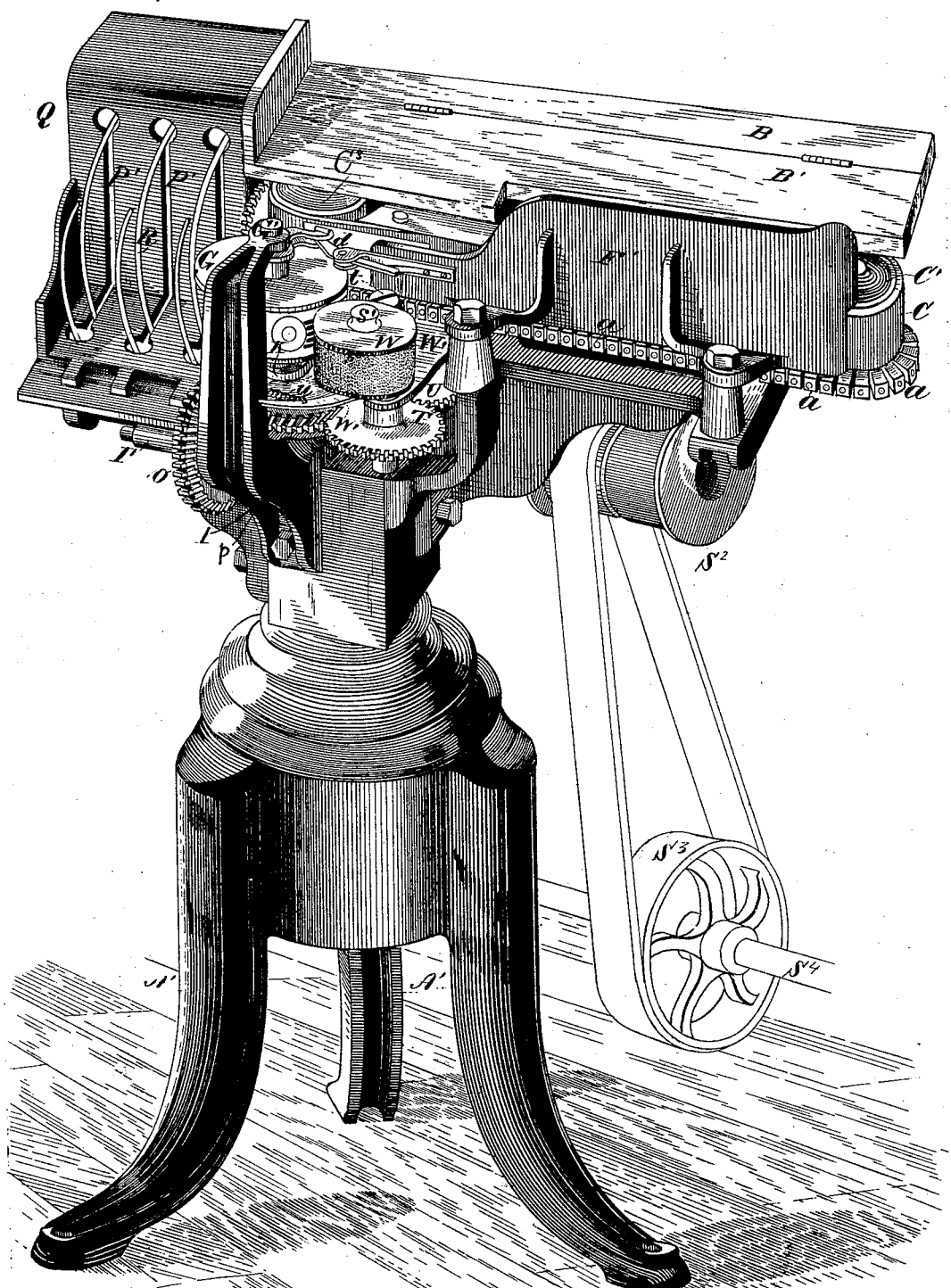
Figure 2:
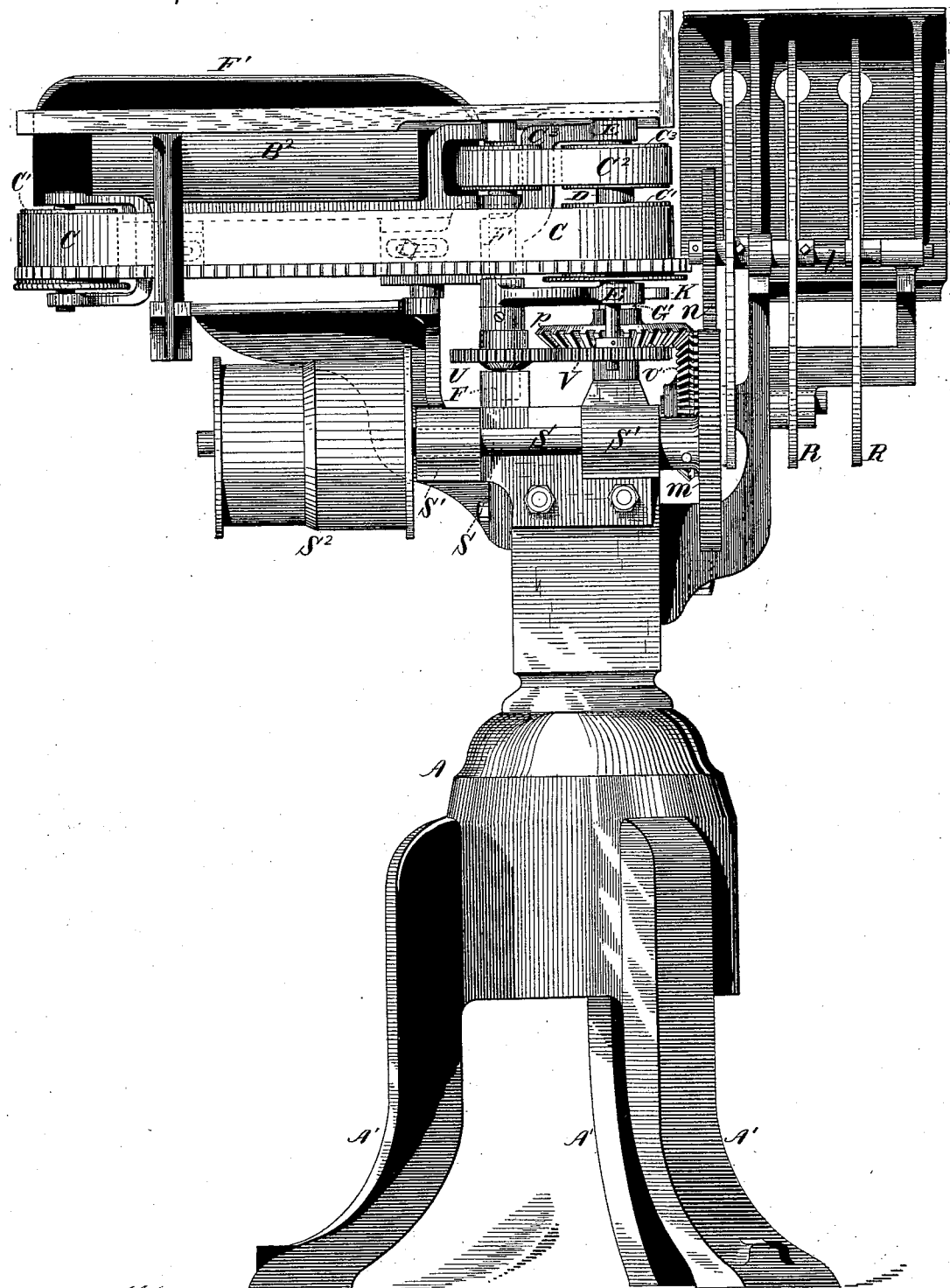
Figure 3:
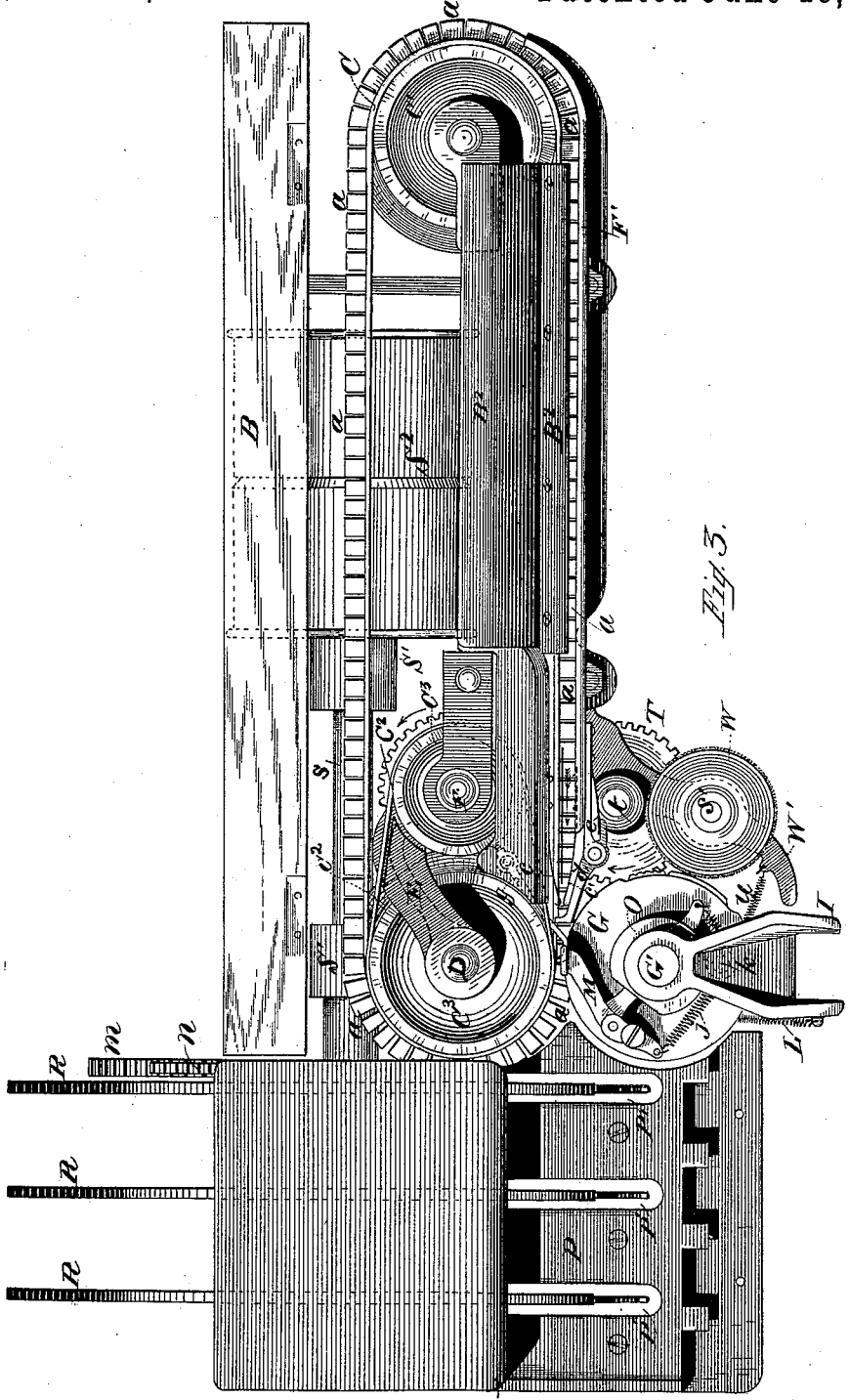
Figure 4:
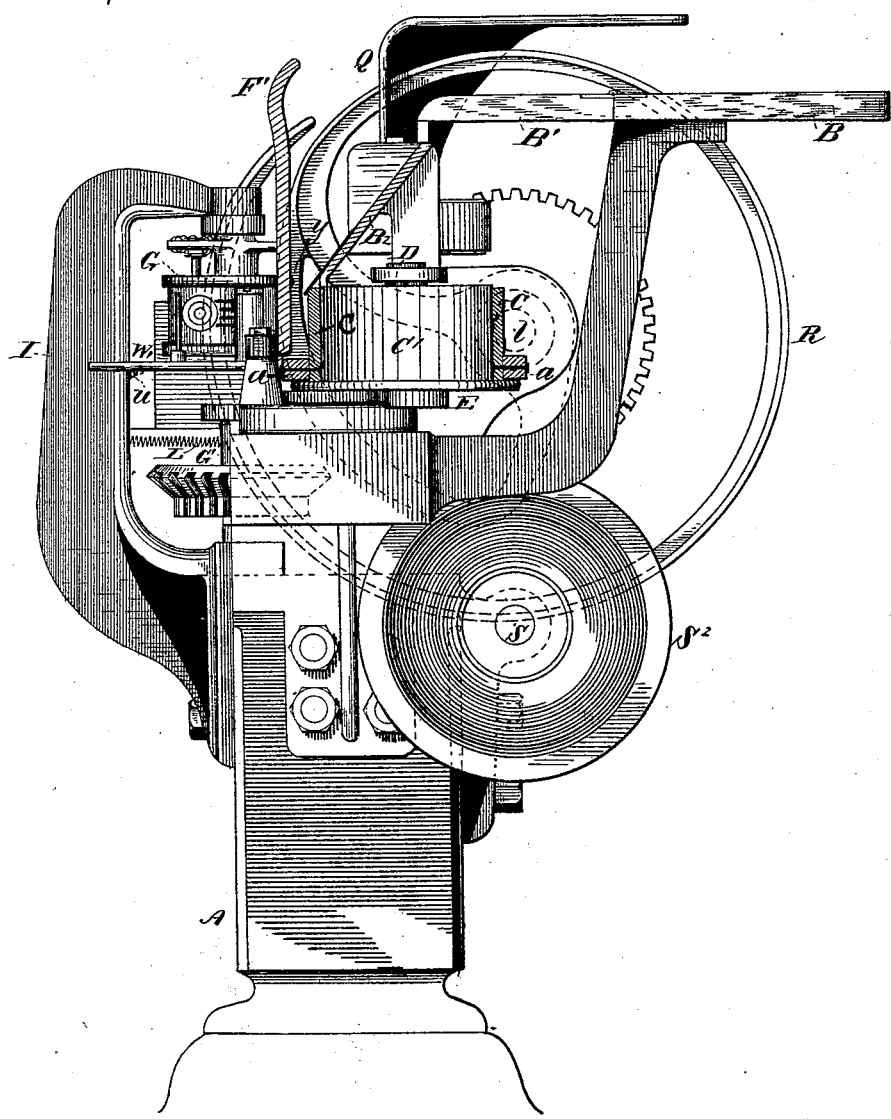
Figure 5:
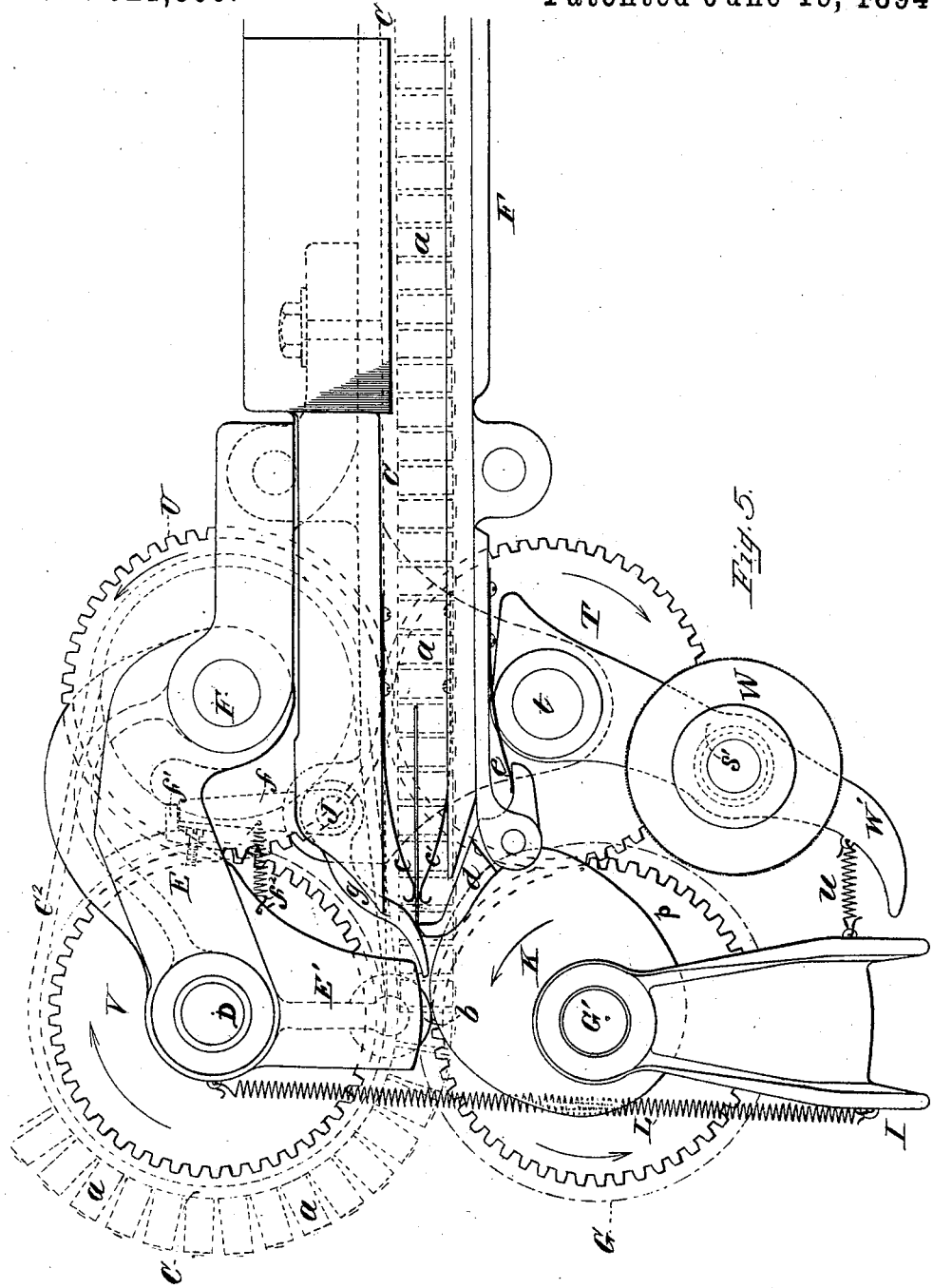

In the accompanying drawings illustrating my invention: Figure 1 is a perspective view of my improved apparatus for stamp-canceling and postmarking letters, cards, newspapers, and similar mail matter. Fig. 2 is a rear elevation of the same. Fig. 3 is a top plan view of the machine. Fig. 4 is a right end elevation, partly in section. Fig. 5 is an outline plan view of the horizontal gears, the cam, rocker-frame, controlling lever, tripping post, and adjacent parts. Fig. 6 is a face view of the printing roller, and the clamping feet. Fig. 7 is a side view of the printing roller, showing the clamping feet, springs, &c. Fig. 8 is a partial face view on an enlarged scale representing the imprint of the type on the mail matter. Fig. 9 is a partial longitudinal section of the printing roller, showing the arrangement of the type or dies. Fig. 10 is a detail view of the controlling lever or tripping lever. Fig. 11 is a detail view of the rock shaft together with the trip lever and supporting post. Fig. 12 is a transverse sectional detail of the inking roll. Fig. 13 is an edge view of the cam. Fig. 14 is a plan view of the cam. Fig. 15 is a plan view of the supporting post. Fig. 16 is a sectional view of the printing type. Fig. 17 is a detail view of the type pin.

Similar letters of reference designate like parts throughout all the different figures of the drawings.

The various mechanical devices which constitute my present improved machine are mounted on any suitable framework that comports with their structure, relative arrangement and condition, the example of said framework taken for illustration in the present instance being of a tripod form with main body A, and legs A'.

At the top of the apparatus is a facing table upon which the letters, cards and similar pieces of mail matter are thrown promiscuously, and from which they are taken by the operator and placed singly upon the moving carrier, which conveys them to the canceling and marking devices. Said facing-table may constitute an integral part of the stamp-canceling apparatus, or it may be an independent adjacent structure, whichever may be more convenient and desirable. B denotes a portion of said table, and B' another part thereof, which is preferably hinged to the part B, said part B' being located above the moving letter carrier, and since it is hinged, it is obvious that it may be readily lifted at any time to permit access to the mechanical devices beneath.

The moving carrier or support for conveying the letters and other pieces of mail matter to the postmarking and stamp-canceling mechanism comprises a shouldered belt or its equivalent, one form of which is represented in the drawings as consisting of a belt C mounted on rolls C' C' by means of one of which the belt is actuated, said rolls being properly journaled in the machine. The lower edge of the belt or band C is provided with a series of projections or shoulders *a a* by which the letters and other pieces of mail matter are adjusted and supported in a uniform position or alignment. The belts and rolls also together with the printing roller or cylinder and its accompaniments are situated in an upright or vertical position. The mail matter is thus caused by gravity to assume an upright position on the shouldered belt. By this shouldered belt which constitutes a vertical moving carrier the letters are automatically conveyed to the printing devices, their progress being regulated by appropriate mechanism to be hereinafter described, which mechanism is controlled by each individual piece of matter in such a way as to secure a clear and well defined registry of the postmark and cancellation mark at the proper point upon the mail package or its envelope. In addition to the main belt C, I often employ a supplementary or auxiliary belt $C^2$ mounted on rolls $C^3$ $C^3$, one of the rolls $C^3$ being above and on the same shaft as that one of the rolls $C'$ which is located opposite the printing roller, and which it may here be stated serves as an impression roll as well as a band-carrying roll or driver. The other roll $C^3$ is journaled a short distance from its companion, the belt $C^2$ being of a short length. Said belt is situated in an upright position above the main belt C. The belt $C^2$ is not essential but may be used if desired.

As already mentioned, one of the band rolls $C'$ serves as the impression roll. It is yieldingly arranged opposite to the printing roller. Its shaft D which also carries one of the rolls $C^3$, when the supplementary belt is used, is journaled in an upright position in the rocker frame E, see Fig. 2. This rocker frame has a vertical portion which forms a tubular socket to receive an upright shaft F on which the rocker frame swings or oscillates. The rocker frame has an upper arm which is entered by the upper end of the impression roll shaft D, the lower end of said shaft being journaled in the lower arm of the rocker, which lower arm has a horizontal projection E' (see Fig. 5) extending toward the printing roller, and furnished with an antifriction roller $b$ in the end thereof, on which a cam K acts, as will be hereinafter explained.

In order to facilitate the speedy transfer of the letters, cards, newspapers or other similar pieces of mail matter from the facing table to the moving support, an incline is provided consisting of a plate or board $B^2$ (see Figs. 3 and 4) the upper edge of which is contiguous to the edge of the facing table, the said board being upheld by connection with the facing table or with some part of the machine frame, and the lower edge of the incline being in close proximity to the upper edge of the moving belt. The incline may have a greater or less length as desired. In practice it will doubtless be found that it need have no considerable length, but as delineated in the drawings, may be of sufficient size to cover the space over which the letters are handled during the process of alignment on the moving support and thus prevent them from dropping down and becoming confused among the mechanical parts beneath. Alongside of the moving belt and parallel thereto, and likewise opposite the incline and the facing table, is a vertical longitudinal plate or guard F' secured rigidly on the machine frame, and having suitable dimensions. This vertical plate forms with the moving belt a hopper, so that the pieces of mail matter which have been adjusted upon the shoulders $a$ $a$ of the belt, are kept in place while being conveyed to the printing devices. Each letter, card, newspaper, or other similar piece of mail matter is conveyed by the conveying belt or support C without friction until it arrives at and passes between the converging letter deflecting springs or guides $c$ $c'$, see Figs. 3 and 5, which are arranged to project from opposite sides of the hopper into the letter path just above the conveying belt, the ends of said springs being close to each other, as shown in Fig. 5. The springs $c$ $c'$ constitute what may be termed the letter guide. These springs are similar in form, and are securely fastened to opposite sides of the hopper at points directly opposite to each other. They incline toward each other in a V-form with their forward free ends closely contiguous to each other and almost in contact. Each piece of mail matter as it passes along is directed between these springs, which are made sufficiently yielding to permit the passage of the piece of mail matter between the free ends thereof, and yet since both said ends are in simultaneous contact with directly opposite sides of the piece of mail matter, it will be guided surely forward. I am aware that in my former patent, No. 323,799, dated August 4, 1885, I have employed two guides in the letter path, one being a letter-elevating spring or guide and the other being a pressure arm, but these springs do not operate in the same way nor are they arranged in the same manner as the converging letter-deflecting springs embraced in my present application. In said patent, one of the springs which is located near the controlling lever elevates each piece of mail matter that passes so that it may the more readily strike the timing lever, while the other spring is simply a forwardly-depending guide or pressure arm which bears upon the rear portion of the traveling letter or package after its forward end has touched the timing lever and consequently prevents a rebounding of said letter while the same is passing through the printing devices. Thus it will be seen that the function and operation of the pressure arm and the elevating spring in said patent are entirely different from that of the two converging springs found in this case. These springs act to guide the forward end of the letter or other piece of mail matter surely without regard to the thickness of the package, to a yielding timing lever $d$ that is pivoted to a suitable support, see Figs. 1 and 3, and provided with a spring $e$, by which it is returned to its obstructive position in the letter path after the letter has passed. It will be understood that each piece of mail matter is stopped by the contact of its forward end with the timing lever, and that the letter remains in this retarded position until the rotation of the type or printing cylinder has brought its type and canceling dies nearly to the point where the impression is to be made.

The printing roller or post-marking cylinder G is secured on a vertical shaft G' journaled at its upper and lower ends in the machine frame, said frame having a curved standard I bolted thereto whose top arm receives the upper journal end of shaft G'. The printing roller or cylinder has a rotary movement only. It has no oscillatory or vibratory motion. Its face however is situated in close proximity to the moving belt C, but in order to prevent said belt from bearing upon the non-vibratory printing roller, and thus soiling itself, which would work a consequential injury by way of defacement of the mail matter, such conjunction of belt and roller being extremely liable to occur when mail matter is not passing, since the impression roll is yieldingly arranged by means of the spring L connected to the rocker-frame and also to some rigid part of the frame, as for instance the part I so that said impression roll is being constantly urged in the direction of the printing roller, means are provided for automatically holding the rocker frame and its attached mechanism, including the belt, away from the printing roller until the letter, card, package, newspaper, or other similar piece of mail matter is about to pass. This is accomplished by providing a rock-shaft J, see Fig. 11, journaled vertically in the machine. The rock-shaft J carries a horizontal controlling lever arm $g$ adjustably fastened thereon by means of a set screw, which lever projects into the letter-path just above the upper edge of belt C and in close proximity to the printing roller at a point where each passing piece of mail matter will collide with it. The rock-shaft also carries a lug or post $f$, secured horizontally thereto, which is adapted to fit a notch $f'$ in the edge of the rocker frame E. When after the cam moves the rocker frame and releases the post the controlling lever $g$ is displaced from its normal position in the letter path by the letter or other piece of similar mail matter, as it begins to pass between the printing cylinder and impression roll, a partial rotation will be imparted to the rock-shaft J, thus causing the part $f$ to be moved out of the notch $f'$, which manifestly results in taking away the prop which restrains the tendency of the impression roller and belt to move under action of spring L toward the printing roller, thereby permitting the said roller to be in printing contact with the letter or card on the moving support. While the belt and impression roller remain removed at the normal distance from the printing roller, the tripping post $f$ is held within the notch $f'$ by means of a spiral spring $f^2$ connected to the post $f$ and rocker frame E. The printing roller shaft G' has mounted thereon a cam K that bears against the small roll $b$ in the extension E' of the rocker arm, as was above alluded to. After a letter has been marked and canceled the continued rotation of the roller G and cam K, brings the point of the cam into contact with the friction roll $b$ and thereby oscillates the rocker frame E, thus allowing the post $f$, together with the controlling lever $g$ to fly back under the tension of spring $f^2$ to their normal position, the post then holding the rocker frame, the impression roller and the belt away from the printing mechanism until the passage of another piece of mail matter again deflects the controlling lever and causes the belt to shift toward the printing roller as before.

The letter, card, newspaper, or other similar piece of mail matter is propelled or moved past the timing lever $d$ by the drawing or traction force exerted thereon by means of yielding clamping feet M M. See Figs. 3, 6 and 7. These feet are movably secured upon the upper side of the printing roller so as to project at times over the periphery of the latter and along opposite sides of the timing and controlling levers. The casting that forms the body of the clamping feet is pivoted at $h$ to the lever N which is pivotally mounted on the printing roller shaft G' so as to oscillate thereon, see Fig. 7. Further, the casting that forms the clamping feet is provided with a roll $i$ which acts in conjunction with a stationary cam O, see Fig. 3, above the printing roller, the roll $i$ being held in contact with the cam at certain times by means of the spring $j$ which is fastened to the end of the aforesaid clamping-feet-casting, also to the end of lever N, and also to the roll stud $k$ in the top of the printing roller. Hence it will be seen that the clamping feet revolve, one on each side of the levers which time the letter and control its passage so as to exert at proper intervals a suitable pressure and traction on the mail matter that is brought to the timing lever by the traveling bands. The drawing pressure exerted upon the letter by the clamping feet M M is sufficient to cause the letter to push the timing lever $d$ sidewise and out of its path, the letter or the piece of mail matter being prevented from rebounding by the springs $c$ and $c'$ before described. By means of the movable feet M M the pieces of mail matter after being respectively timed by the lever $d$ are consecutively carried over the controlling lever $g$, thereby depressing the same and throwing the post $f$ out of its engagement with the rocker arm whereby the mechanism is set in motion which brings the printing roller into proper position to seasonably execute its functions as has already been explained above.

The joint action of the printing roller G, the impression roll C', the shouldered belt C and the yielding feet M is such that the letter, card, or other piece of mail matter after being postmarked is quickly deposited upon a horizontal table or tray P having a vertical rear or back portion Q, said horizontal and rear portion of the table being provided with slots P' P' for the passage of cams R R that are mounted on a shaft $l$ journaled in suitable bearings beneath and behind the table. The cams R R are each composed of a rigid segmental stock or body from which springs a curved elastic finger. The letters, cards and other pieces of postmarked and canceled mail matter are delivered successively in a vertical position upon the table P within the space inclosed by the cam fingers and resting against the vertical back Q. As the cams rotate, the pieces of mail matter will be packed and propelled forward until they are taken up by the hands of the operator for distribution as may be desired.

The traveling belt or letter conveyer C, the printing cylinder G and the various mechanical parts of my improved stamp canceling machine receive motion simultaneously by intermediate gearing from a counter shaft S which is journaled in suitable bearings S' S' in the rear portion of the machine frame. On this counter shaft is a fast and loose pulley $S^2$ which is connected by suitable belting with a pulley $S^3$ on a main shaft $S^4$ which is driven by any suitable and convenient driving power, see Fig. 1. On the end of the shaft S is a gear wheel $m$ which engages a gear $n$ on the end of the shaft $l$ that carries the curved letter packing cam fingers R. The gear wheel $m$ also engages the straight portion of a double gear $o$ mounted on a stud carried by the main frame, see Figs. 1 and 2. The bevel portion of the double gear $o$ engages the bevel gear $p$ secured on the shaft G' of the printing roller G. Said bevel gear $p$ has a straight portion which meshes with a gear wheel T located horizontally and carried by a vertical stud or shaft. This gear T in turn engages a horizontal gear U on the shaft F, whereon the rocker frame swings. This gear U engages a gear V supported on the lower end of shaft D which passes down through the rocker frame and which carries the impression roll that serves also as one of the drive rolls. By these connections thus described it will be seen how motion is communicated to the moving carrier or belt. The gear V has its periphery in close proximity to the gear $p$ but does not mesh therewith.

The inking roll W is mounted loosely on a spindle $s$ which is supported by an arm W' pivoted at $t$ on the main frame of the machine, said inking roll being rotated by frictional contact with the printing roller G in contact with which it is held by means of a spring $u$ extending from the movable end of the arm W' and connected to the casting I, of the machine frame. On the upper face of said ink pad or roll is an internally screw-threaded cap nut $s'$ which engages a tubular spindle within the roll on the opposite end of which is a plate $s^2$. The nut and the plate and tube constitute a clamping means for tightly gripping the felt substance of the roll.

The printing roller is provided with a suitable stamp-canceling die $w$ formed on the cylinder and a suitable detachable post-marking die $v$, see Figs. 6, 8 and 9.

$x$, Fig. 16 denotes a thimble or socket which is inserted into the postmarking die $v$. This thimble enables flat type blanks to be used instead of the customary and ordinary quartered and tapered ones. In Fig. 17 is shown the type pin employed as indicated in Fig. 16 for the purpose of holding the type firmly in place in the thimble $x$.

Referring to Fig. 4 of the drawings it will be observed that a beaded edge, ridge, or flange $y$ runs along on the inner face of the side plate F' and opposite the conveying belt. This bead $y$ serves to take the friction of the letter, and in actual practice is found to be a valuable adjunct to the hopper. Its size may vary and its length be greater or less, as preferred.

By my improved machine all the manual labor of stamping is avoided and effective means provided for accurately locating the cancellation and postmark in less time than is ordinarily required for picking up and facing letters by the hand-stamp process. Accurate and legible stamping and imprinting of the name of post-office and date, a matter which has now come to be a necessity in the complex relations of business, are promoted and insured by my improved machine. The machine having been put in motion by steam or other power, the operator as fast as he can pick up the letters from the facing table, is required only to drop them separately into the hopper upon the shouldered carrying belt in an upright position and all facing in the same direction and with the stamps all in the same relative position. Letters, cards, and other pieces of mail matter will thus be conveyed to the printing roller and temporarily stopped near thereto by colliding with the timing lever. When the post-marking or printing roller has rotated to a predetermined point its attached clamping feet will after the cam first releases the post grasp the letter that rests against the timing lever and convey it past said lever and over the controlling lever which is consequently displaced or deflected, thereby disengaging the tripping post from the rocker arm and causing the hitherto restrained impression roller to be shifted close to the printing roller and thus the letter pushed against the said printing roller which will at once make its impression with accuracy and distinctness. The impression having been made by and between the printing roller and impression roller the removal of the impression roller from close proximity to the printing roller consequent upon the rotation of the cam prevents a deposit of ink on the letter belt, after the postmarked letter has been transferred to the packing cams.

Having thus described my invention, what I claim as new, and desire to secure by Letters Patent, is—

1. In a stamp-canceling and post-marking machine, the combination of the vertical belt C, mounted on suitable rolls and having its lower edge provided with a series of projections $a\ a$, the incline consisting of the plate or board $B^2$, the facing table and the vertical longitudinal plate or guard $F'$ secured rigidly on the machine frame alongside of the moving belt and parallel thereto.

2. The combination with the letter hopper, of a pair of similarly-converging letter-deflecting springs or guides secured therein at points directly opposite to each other on opposite sides of the hopper, and projecting into the letter-path with their free yielding ends closely contiguous to and almost in contact with each other so that each piece of mail matter may be received directly between them and be simultaneously acted on by both so as to be guided forward, substantially as described.

3. The combination of the facing table, the vertically moving belt or carrier, the vertical longitudinal plate or guard alongside thereof, and the two converging letter-deflecting springs or guides of similar shape and arrangement secured within the hopper at points directly opposite to each other on opposite sides thereof and projecting into the letter path with their free yielding ends closely contiguous to and almost in contact with each other so that the letter may be received between them and simultaneously acted on by both so as to be surely guided forward, the rotary printing roller, the impression roller, one of which is yieldingly arranged relatively to the other, substantially as described.

4. In a stamp-canceling and post-marking machine, the combination of the letter hopper or receptacle, consisting of the vertical moving support having a series of projections on the lower edge thereof, a vertical plate located opposite said support and parallel thereto at a suitable distance therefrom, the facing table and an incline above the support and between it and the facing table, the printing roller, impression roller and letter guide, substantially as described.

5. The combination with the letter hopper, of the pair of similarly-shaped and arranged letter-deflecting springs or guides located within the hopper and secured at points directly opposite to each other on opposite sides of the hopper in a V-shape, so as to project into the letter-path with their free yielding ends closely contiguous to and almost in contact with each other so that each piece of mail matter may be received directly between them and so be surely guided forward, and a yielding timing lever against which the forward end of each letter is directed by the aforesaid springs, substantially as described.

6. In a stamp-canceling and post-marking machine, the combination of a letter hopper or receptacle consisting of the vertical-moving support having a series of projections on the lower edge, a vertical plate opposite said support at a suitable distance, the facing table, the converging letter deflecting springs or guides arranged in the hopper so as to project from opposite sides thereof, the ends of said springs being close to each other so that they may act to move the letter slightly away from the belt and guide its forward end, and a yielding timing lever in advance of said springs and arranged to be encountered by the letter after it passes said springs, substantially as described.

7. The combination of the hopper or receptacle, consisting of a vertical moving support having a series of projections on the lower edge thereof, a plate located opposite said support, parallel thereto and at a suitable distance therefrom, the facing table, the printing roller and the impression roller, one of which is yieldingly arranged relatively to the other and the letter deflecting springs or guides arranged convergingly within the hopper so as to project from opposite sides of said hopper with their ends closely contiguous to each other, substantially as described.

In testimony whereof I affix my signature in presence of two witnesses.

MARTIN V. B. ETHRIDGE.

Witnesses:
CHAS. HALL ADAMS,
G. W. TROWBRIDGE.